July 20, 1948.
W. SUMMERBELL
2,445,339
GUN TUBES, BREECH RINGS AND
COUPLING MEANS THEREFOR
Filed Sept. 11, 1946
4 Sheets-Sheet 2
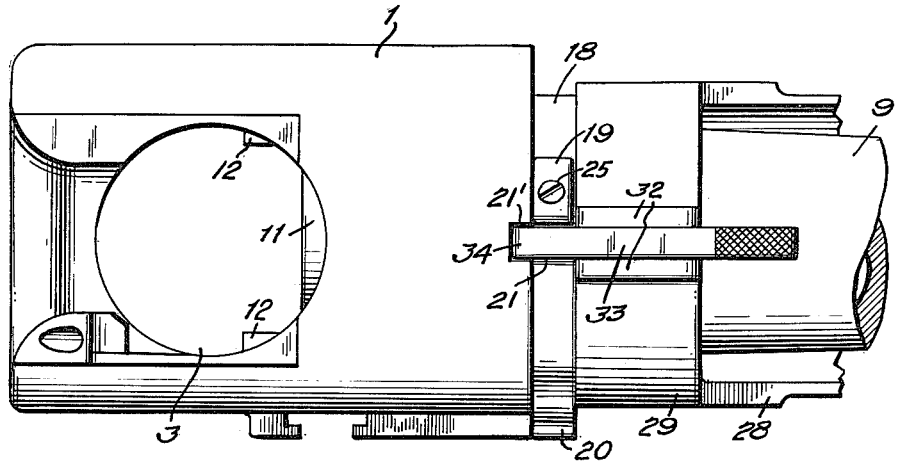
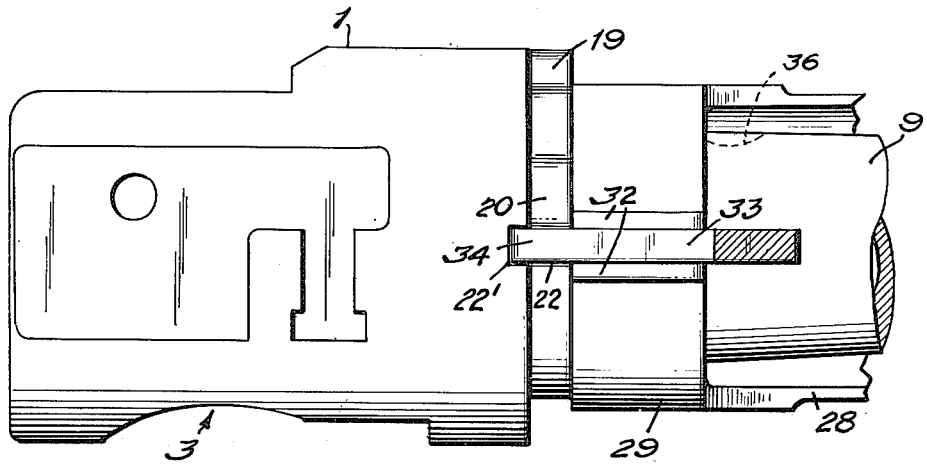
Inventor
William Summerbell July 20, 1948.　　W. SUMMERBELL　　2,445,339
GUN TUBES, BREECH RINGS AND
COUPLING MEANS THEREFOR
Filed Sept. 11, 1946　　4 Sheets-Sheet 3
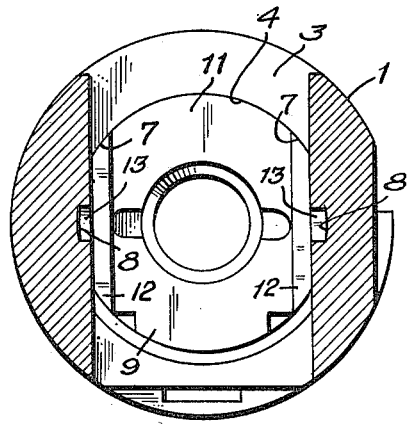
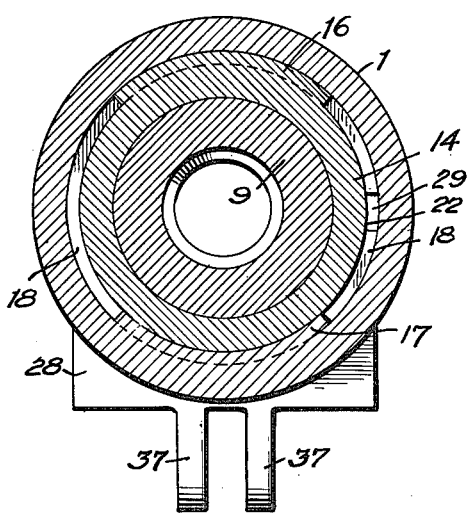
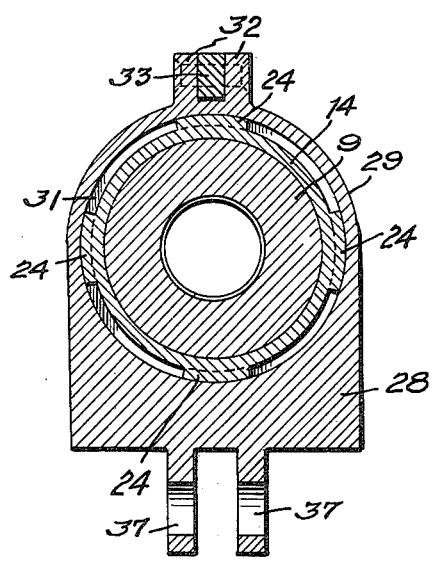
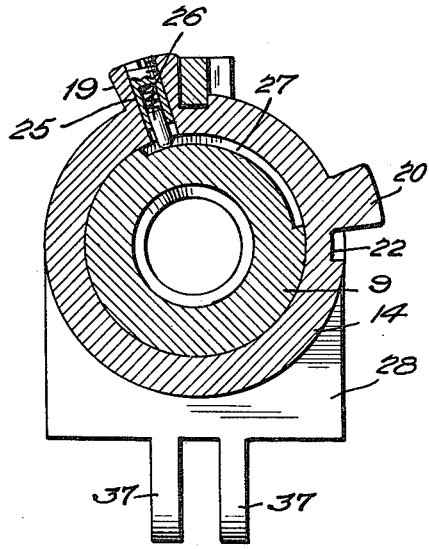
Inventor
William Summerbell

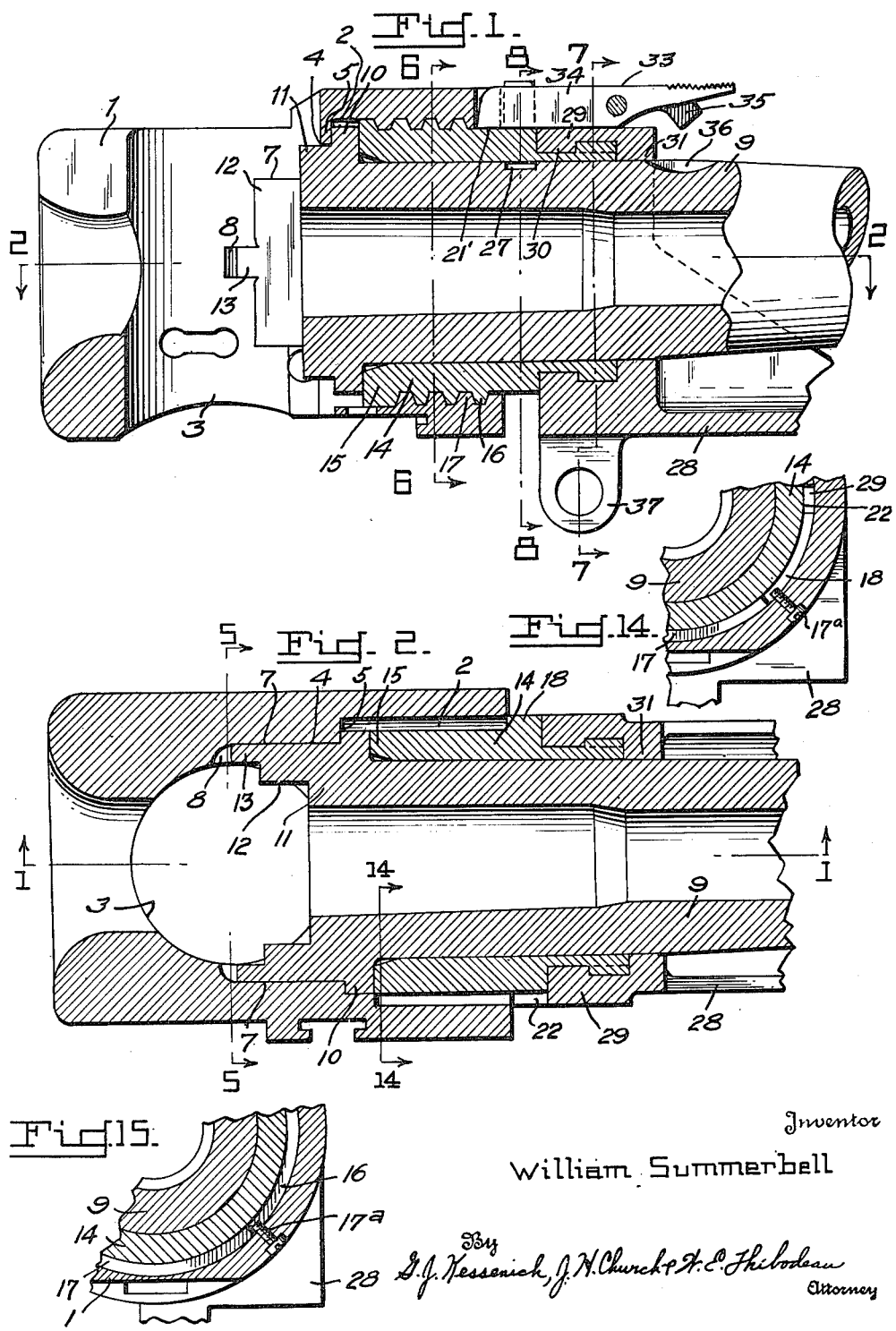

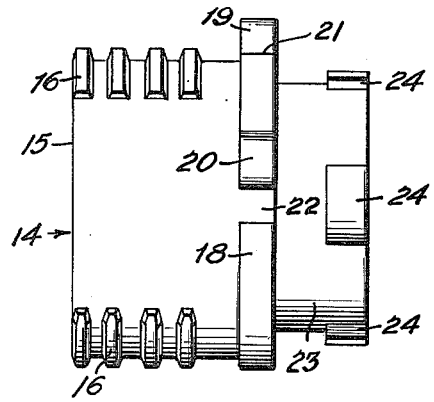
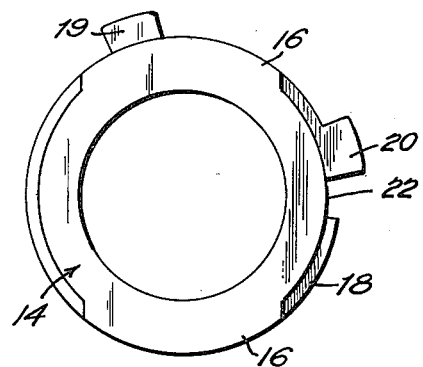
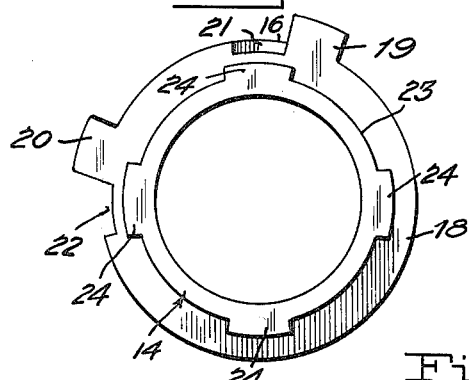
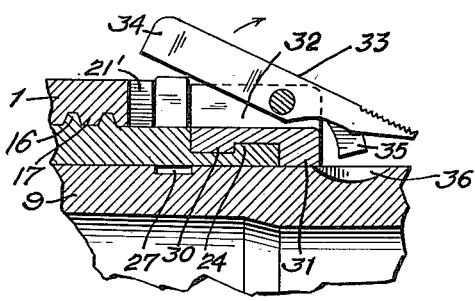
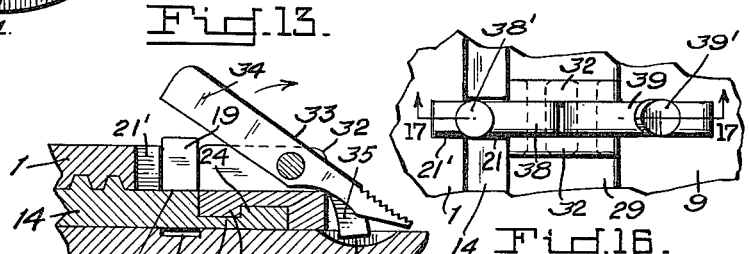
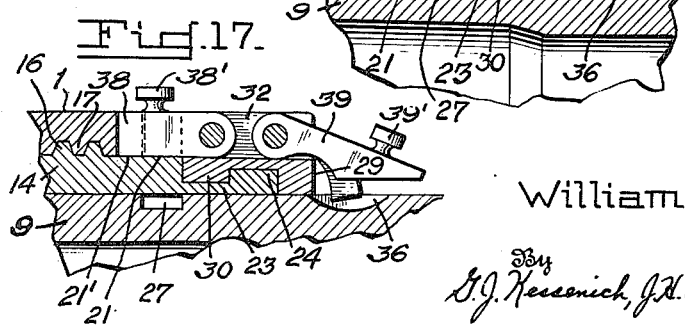

Patented July 20, 1948

2,445,339

UNITED STATES PATENT OFFICE 2,445,339

GUN TUBE, BREECH RING, AND COUPLING MEANS THEREFOR

William Summerbell, Washington, D. C.

Application September 11, 1946, Serial No. 696,329

10 Claims. (Cl. 89—14)

(Granted under the act of March 3, 1883, as amended April 30, 1928; 370 O. G. 757)

The invention described in the specification and claims may be manufactured and used by or for the Government for governmental purposes without the payment to me of any royalty thereon.

This invention relates to a new and useful improvement in gun tubes, breech rings and coupling means therefor, and is intended more particularly to provide a gun having a breech mechanism for vertical and side opening, alternatively, and having a threadless joint between the tube and breech ring. The particularly novel and useful features of my improved device are the peculiar breech ring structure, tube structure, gun sleigh structure, and a coupling sleeve serving to mount the coupled ring and tube in the sleigh. The several parts are so designed that the tube with the coupling sleeve thereon is placed in the sleigh. The breech ring is mounted on the tube and sleeve, and the sleeve is rotated to couple the ring to the tube and lock both securely in the sleigh. The tube and ring are provided with co-acting portions, respectively, to prevent relative rotation when assembled, and the coupling sleeve is designed to co-act with both the tube and ring to prevent relative axial movement of tube and ring and secure both in fixed relation to the sleigh. The tube and ring, held in relatively fixed relation by the coupling sleeve, can be rotated in the sleigh, by means of the sleeve, to modify the breech mechanism for vertical and side opening, alternatively.

While one specific embodiment of the invention is illustrated in the drawings filed herewith, and hereinafter fully described, it is to be distinctly understood that the invention is not considered to be limited to said specific embodiment but that its scope is defined by the claims appended hereto.

In the drawings:

Fig. 1 is a vertical section on the line 1—1 of Fig. 2, in the direction of the arrows;

Fig. 2 is a horizontal section on the line 2—2 of Fig. 1, in the direction of the arrows;

Fig. 3 is a top plan of the parts shown in Figs. 1 and 2;

Fig. 4 is a view similar to Fig. 3, the tube and breech ring rotated 90° to provide a side open breech;

Fig. 5 is a transverse section on line 5—5 of Fig. 2 in the direction of the arrows;

Fig. 6 is a transverse section on line 6—6 of Fig. 1, in the direction of the arrows;

Fig. 7 is a transverse section on line 7—7 of Fig. 1, in the direction of the arrows;

Fig. 8 is a transverse section on line 8—8 of Fig. 1, in the direction of the arrows;

Fig. 9 is a side elevation of the coupling sleeve;

Fig. 10 is a rear elevation of the sleeve;

Fig. 11 is a front elevation of the sleeve;

Fig. 12 is a fragmentary section partly in elevation of the tube and breech ring as shown in Fig. 1, showing the latch in unlocking position;

Fig. 13 is a view similar to Fig. 12, showing the latch locking the tube;

Fig. 14 is a fragmentary vertical section on the line 14—14 of Fig. 2, in the direction of the arrows;

Fig. 15 is a view similar to Fig. 14, the sleeve being uncoupled from the breech ring;

Fig. 16 is a fragmentary top plan of a modified form of latching means for locking the breech ring and coupling sleeve, and the tube simultaneously;

Fig. 17 is a vertical section on the line 17—17 of Fig. 16, in the direction of the arrows.

As illustrated in the drawings, the improved gun has a breech ring 1 having in its forward end a bore 2 co-axial with the gun and a transverse bore 3 to receive the breech block (not shown). An intermediate bore 4 in ring 1 connects bores 2 and 3. Bore 4 is co-axial with bore 2 and of less diameter forming an inner peripheral shoulder 5 in ring 1 at the rear end of bore 2. The ring 1 is provided with a pair of recesses 7 rearwardly of bore 4, and a pair of sockets 8 rearwardly of recesses 7. These recesses 7 and sockets 8 are formed in the wall about bore 3, symmetrically disposed on either side of the longitudinal axis of ring 1 and have arcuate surfaces concentric with bores 2 and 4. A tube 9 received in ring 1 has a peripheral flange 10 seated in bore 2 against shoulder 5, neck 11 seated in bore 4, wings 12 seated in recesses 7 and tongues 13 seated in sockets 8. A coupling sleeve 14 about tube 9 has its rear end 15 seated against flange 10 and is provided with interrupted threads 16 meshing with interrupted threads 17 on the inner periphery of ring 1 in the bore 2.

The ring 1 is provided with a radially disposed stop pin 17-a extending into bore 2 to co-act with threads 16 and 17 for coupling the ring 1 and sleeve 14, as will be presently explained. Sleeve 14 has a peripheral collar 18 spaced forwardly of threads 16 and having radial lugs 19 and 20 (Figs. 9, 10 and 11) and sockets 21 and 22 associated with lugs 19 and 20, respectively. The lugs 19 and 20 are relatively disposed at 90° on the periphery of collar 18. The sleeve 14 has a reduced portion 23 forwardly of collar 18 on the forward end of which there are four radial lugs 24 symmetrically disposed about sleeve 14. It will be noted (Fig. 11) that the sockets 21 and 22 and lugs 24 are so relatively disposed that socket 21 is aligned with lug 24 of one pair of lugs and socket 22 with lug 24 of the other pair. Lug 19 of sleeve 14 has an axial bore 25 (Fig. 8) opening through sleeve 14 in which is mounted a spring-pressed pin 26 received in an arcuate slot 27 on the periphery of tube 9. It will be noted (Fig. 8)

that slot 27 extends through an arc of 90°. The reduced portion 23 of the sleeve 14 is mounted in the sleigh 28 provided with a collar 29 in which sleeve 14 is received. The collar 29 has interior radial lugs 30 co-acting with lugs 24 to form a bayonet coupling, and an inner peripheral flange 31. The collar 29 has a pair of upstanding lugs 32 (Fig. 7) in which is pivoted a double rocker arm 33 extending rearwardly sufficiently to dispose its rear latch 34 in slots 21 or 22 of sleeve 14 and slots 21' or 22' in the forward edge of ring 1, when its rear end is depressed (Fig. 1) and extending forwardly so that its forward latch 35 is disposed in slot 36 in the periphery of tube 9 when its forward end is depressed (Fig. 13). The arm 33 can assume a neutral position (Fig. 12), so that both latches 34 and 35 are inoperative. Sleigh 28 has two depending lugs 37 to which is attached the recoil mechanism (not shown).

From the foregoing description of the details of construction of the improved gun, its use and operation will be obvious. The parts are assembled as follows: the sleeve 14 is disposed on tube 9, its end 15 bearing against flange 10, the tube 9 and sleeve 14 are disposed in sleigh 28, the sleeve 14 being rotated on tube 9 to permit its lugs 24 to pass between lugs 30 in ring 29 and against flange 31. Tube 9 is snugly received in flange 31. Sleeve 14 is then rotated to cause its lugs 24 to co-act with lugs 30 (Fig. 1) to lock the sleeve 14 and tube 9 in sleigh 28. The parts are so positioned (Figs. 1 and 8) that tube 9 has its slot 36 aligned with latch 35 and pin 26 is at the left end of slot 27 (Fig. 8). When arm 33 is rocked to place latch 35 in slot 36 (Fig. 13) to prevent rotation of tube 9, sleeve 14 is rotated clockwise (Figs. 8 and 15) to bring pin 26 to the right end of slot 27. The ring 1 is then placed about the rear end of tube 9 and sleeve 14, its transverse bore 3 being vertical, its interrupted threads 17 passing between interrupted threads 16 of sleeve 14. The forward movement of ring 1 is arrested when pin 17-a in bore 2 of ring 1 contacts the rear edge of the interrupted threads 16 in sleeve 14 (Fig. 15) and thereby properly relates threads 16 and 17 for intermeshing. The sleeve 14 is then rotated counter-clockwise (Fig. 8) causing threads 16 and 17 to intermesh and draw ring 1 forwardly until its shoulder 5 bears against flange 10 of tube 9, its bore 4, recesses 7 and sockets 8, receiving neck 11, wings 12 and tongues 13, of tube 9, respectively. The arm 33 is then rocked to dispose its latch 34 in slots 21 of sleeve 14 and 21' of ring 1, thus locking ring 1 and tube 9 in sleigh 28.

It will be observed (Fig. 1) that when the parts are in the described positions the ring 1 and tube 9 are locked against relative axial movement by flange 10 clamped between shoulder 5 of ring 1 and end 15 of sleeve 14. Latch 34 when engaged in slots 21 and 21', prevents relative rotation of ring 1, sleeve 14 and sleigh 28. Ring 1 and tube 9 are locked against relative rotation by co-action of recesses 7 and slots 8 of ring 1 and wings 12 and tongues 13 of tube 9.

The parts can be disassembled by reversing the above described operations.

When it is desired to modify the gun from a vertical to a side opening breech, the arm 33 is rocked to neutral position (Fig. 12) to release both latches 34 and 35, the sleeve 14 is rotated counter-clockwise (Fig. 8), the pin 26 of sleeve 14 causing tube 9 to rotate with sleeve 14, and wings 12 and tongues 13 in recesses 7 and sockets 8 causing ring 1 to rotate with tube 9. When slot 22 of sleeve 14 and slot 22' of ring 1 are aligned with arm 33, arm 33 is rocked to position its latch 34 in slots 22 and 22' (Fig. 4) thereby again locking the parts, the ring 1 now being positioned for side opening.

It will be noted that since lugs 37 of sleigh 28 serve for attachment of the recoil mechanism, the usual depending lug on the breech ring provided for that purpose is eliminated from the improved breech ring, greatly simplifying its fabrication.

A modified form of latching means is shown in Figs. 16 and 17. In this form, instead of the double rocker arm 33 of the form of the device shown in Figs. 1, 3, 4, 12 and 13, there are two latches pivoted in lugs 32 on top of collar 29 of the sleigh 28. Latch 38 with handle 38' is pivoted in lugs 32, extending rearwardly from collar 29, to fit into sockets 21 and 22 of sleeve 14 and sockets 21' and 22' of ring 1. Latch 39 with handle 39' is pivoted in lugs 32, extending forwardly from collar 29, to fit into socket 36 of tube 9. It is obvious that when the device is provided with the two latches 38 and 39, and the ring 1, tube 9 and sleeve 14 are related as shown in Fig. 1, latch 38 positioned in slots 21 and 21' (as latch 34 in Fig. 1) locks ring 1 and sleeve 14 against rotation, and latch 39 can be placed in slot 36 (Fig. 17) to lock tube 9 against rotation. In view of the locking of tube 9 by latch 39, in this form of the device it is not necessary to provide the ring 1 with recesses 7 and slots 8, and tube 9 with wings 12 and tongues 13, to prevent relative rotation of ring 1 and tube 9, since they are locked against rotation by latches 38 and 39, respectively. In this form, the tube 9 is provided with a second slot to receive latch 39, when the parts are moved to position the breech mechanism for side opening.

Having described the invention, what I claim is:

1. In a gun, the combination of a breech ring having an axial bore, and provided with an inner peripheral shoulder at the rear end of said bore; a tube received in said bore and having an outer peripheral flange and a plurality of projections extending axially from the rear end of said tube, the ring having a plurality of depressions formed therein for reception of said projections, respectively; a sleeve on said tube; and means on said ring and said sleeve for confining said flange between said shoulder and said sleeve.

2. In a gun, the combination of a breech ring having an axial bore, and provided with an inner peripheral shoulder at the rear end of said bore; a tube received in said bore and having an outer peripheral flange; a sleeve on said tube; a sleigh; means on said ring and said sleeve for confining said flange between said shoulder and said sleeve; and means for removably attaching said sleeve to said sleigh.

3. In a gun, the combination of a breech ring having a bore; a tube having its rear end received in said bore; a sleeve on said tube; a sleigh; means in said ring, on said tube and on said sleeve for attaching said ring and said tube to prevent relative rotation and axial movement of said ring and said tube; and means on said sleeve and on said sleigh to removably position said ring and said tube in fixed relation to said sleigh.

4. In a gun, the combination of a breech ring having a bore; a tube having its rear end received in said bore; a sleeve on said tube; a sleigh; means in said ring, on said tube and on said sleeve for attaching said ring and said tube to prevent relative rotation and axial movement of said ring and said tube; and means on said sleeve and on said sleigh to selectively position said ring and said tube in any one of a plurality of fixed relations to said sleigh.

5. In a gun, the combination of a breech ring having an axial bore, and provided with an inner peripheral shoulder at the rear end of said bore, and a threaded portion spaced forwardly of said shoulder in said bore; a tube received in said bore and having an outer peripheral flange seated against said shoulder, and an exterior socket; a sleigh having a collar in which said tube is rotatably mounted; a latch mounted on said sleigh co-acting with the socket on the tube to prevent rotation of the tube; and a sleeve rotatable on said tube forwardly of said flange and provided with a threaded portion co-acting with said threaded portion of said ring to draw said ring forwardly and confine said flange between said shoulder and said sleeve when said sleeve is rotated.

6. In a gun, the combination of a breech ring having an axial bore, and provided with an inner peripheral shoulder at the rear end of said bore; a tube received in said bore and having an outer peripheral flange; a sleeve on said tube provided with a plurality of exterior radial lugs; means on said ring and said sleeve for confining said flange between said shoulder and said sleeve; a sleigh provided with an upstanding collar in which said tube and said sleeve are received; an interior peripheral flange in said collar at its forward end in which said tube is seated; a plurality of interior radial lugs in said collar at its rear end and spaced from said flange, said sleeve lugs and collar lugs providing a bayonet joint between the sleeve and the collar for removably positioning the tube and sleeve in the sleigh, and means releasably locking said sleeve and sleigh in a predetermined position of relative rotative adjustment.

7. In a gun, the combination of a breech ring having a pair of sockets; a tube having its rear end received in said ring; means in said ring and on said tube to prevent relative rotation of said ring and said tube; a sleeve on said tube having a pair of sockets; a sleigh having a collar in which said tube and said sleeve are rotatably mounted; means in said tube and said sleeve for rotating said ring and tube by rotation of said sleeve in said collar; and a latch mounted on said sleigh co-acting with the sockets in the ring and the sleeve to prevent rotation of the ring and sleeve.

8. In a gun, the combination of a breech ring having an axial bore, and provided with an inner peripheral shoulder at the rear end of said bore, a threaded portion spaced forwardly of said shoulder and on exterior socket; a tube received in said bore and having an outer peripheral flange seated against said shoulder, and an exterior socket; means in said ring and on said tube to prevent relative rotation of said ring and said tube; a sleeve rotatable on said tube forwardly of said flange and provided with an exterior socket and a threaded portion co-acting with said threaded portion of said ring to draw said ring forwardly and confine said flange between said shoulder and said sleeve when said sleeve is rotated about said tube; a sleigh having a collar in which said tube and said sleeve are rotatably mounted; means in said tube and said sleeve for rotating said tube by rotation of said sleeve in said collar; and a double rocker arm mounted on said sleigh and provided on one end with a latch co-acting with the sockets in the ring and sleeve to prevent rotation of the ring and sleeve, and on its other end with a latch co-acting with the socket on the tube to prevent rotation of the tube.

9. In a gun, the combination of a breech ring having an axial bore, and provided with an inner peripheral shoulder at the rear end of said bore, a threaded portion spaced forwardly of said shoulder and an exterior socket; a tube received in said bore and having an outer peripheral flange seated against said shoulder and an exterior socket; means in said ring and on said tube to prevent relative rotation of said ring and said tube; a sleeve rotatable on said tube forwardly of said flange and provided with an exterior socket and a threaded portion co-acting with said threaded portion of said ring to draw said ring forwardly and confine said flange between said shoulder and said sleeve when said sleeve is rotated about said tube; a sleigh having a collar in which said tube and said sleeve are rotatably mounted; means in said tube and said sleeve for rotating said tube by rotation of said sleeve in said collar; a latch mounted on said sleigh co-acting with the sockets in the ring and the sleeve to prevent rotation of the ring and the sleeve; and a second latch mounted on said sleigh co-acting with the socket on the tube to prevent rotation of the tube.

10. In a gun, the combination of a tube provided with an arcuate slot incised on its exterior periphery concentric with its axis, and an exterior socket; a sleeve on said tube provided with an interior radial pin seated in said slot, and an exterior socket; a sleigh provided with a collar in which said tube and said sleeve are rotatably mounted, said sleeve being rotatable in said collar and about said tube through the arc traversed by said pin in said slot, and said tube being rotated in said collar by rotation of said sleeve when said pin is fully traversed; a rocker arm on said sleigh having two alternatively operable latches co-acting with the tube and sleeve sockets, respectively, to prevent rotation, in the collar of the tube and the sleeve, respectively; a breech ring non-rotatably and axially movably mounted on said tube; means in said ring and on said sleeve for moving said ring axially of said tube when the sleeve is rotated about said tube, the tube being latched against rotation; and means in said ring and said tube to prevent rotation of the ring and tube, when the sleeve is latched against rotation, said ring rotating with the tube when both latches are inoperative and the tube is rotated by rotation of the sleeve.

WILLIAM SUMMERBELL.

REFERENCES CITED

The following references are of record in the file of this patent:

UNITED STATES PATENTS

| Number | Name | Date |
| --- | --- | --- |
| 1,358,343 | Stambaugh et al. | Nov. 9, 1920 |
| 2,014,184 | Linder | Sept. 10, 1935 |

FOREIGN PATENTS

| Number | Country | Date |
| --- | --- | --- |
| 845,174 | France | May 8, 1939 |